Patented Feb. 16, 1954

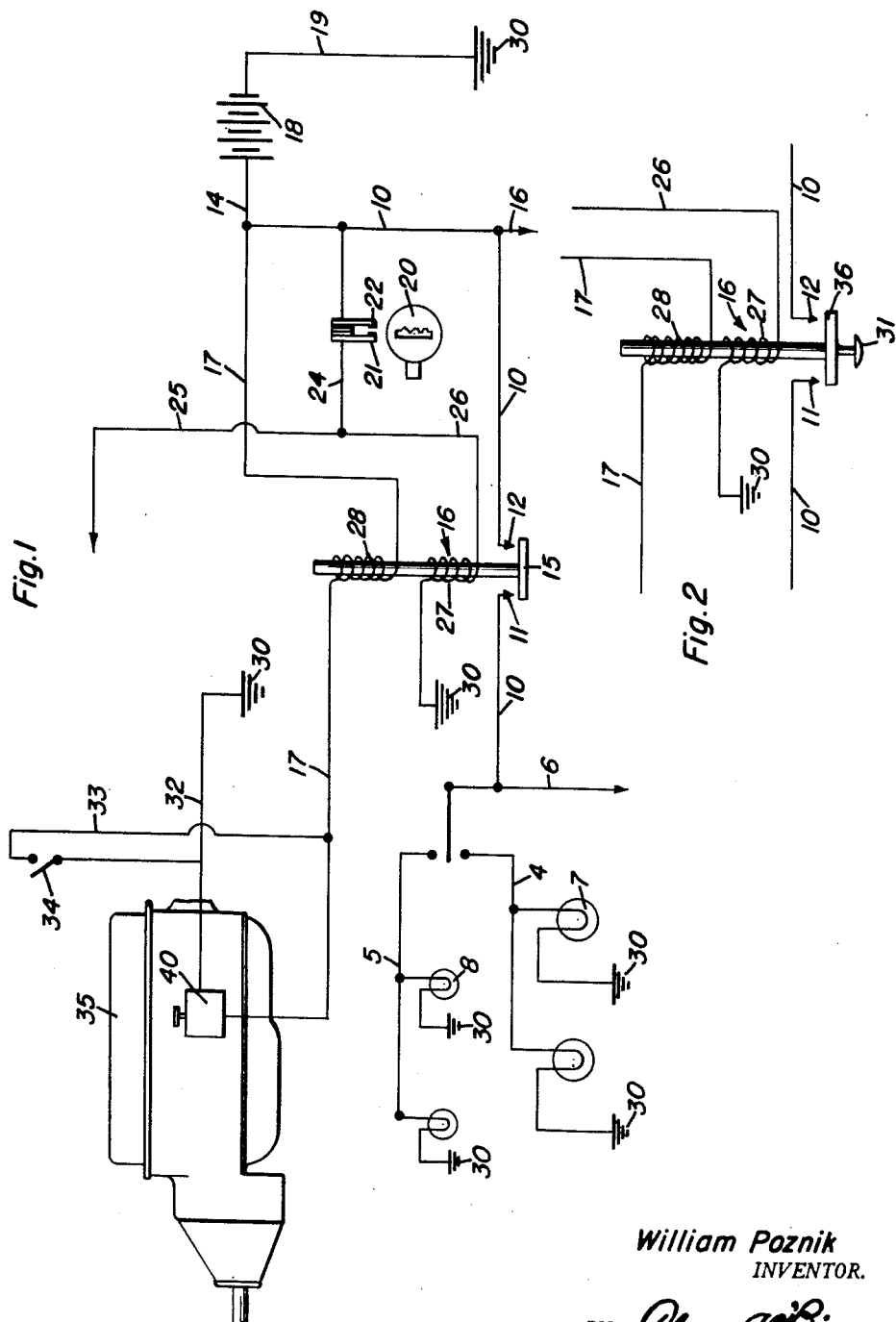

2,669,664

UNITED STATES PATENT OFFICE 2,669,664

PROTECTIVE AUTOMATIC CIRCUIT BREAKING ARRANGEMENT FOR AUTOMOBILES

William Poznik, Hawthorne, Calif.

Application November 6, 1950, Serial No. 194,213

3 Claims. (Cl. 307—10)

This invention relates to protective circuit breaking arrangements for automobiles such as described in my earlier Patent No. 2,497,792, and it has for its object to improve the arrangement shown in the said earlier patent by simplifying the wiring in the circuit arrangement and by making the disabling of the protective circuit dependent on a simple hand manipulation.

In the arrangement disclosed in the said earlier Patent No. 2,497,792, a protective circuit breaker arrangement is provided for the purpose of breaking the circuit or circuits of the current consuming devices in the event that they have not been turned off by the driver as soon as he turns off the ignition and as soon as the engine of the car has cooled down. This breaking of the circuit of the current consuming devices is obtained by means of a thermostatic switch arranged near the engine which controls the ground or return connection of the supply circuit for the said current consuming device. However, it is preferable in many cases to ground the said current consuming device in order to eliminate the return wires by using the car frame as a return conductor. The introduction of the protective arrangement shown in Patent No. 2,497,792 entails re-wiring and the insulating of these devices, which is an expensive operation.

According to the present invention, therefore, the protective thermostatic device does no longer control the return or ground circuit branch of the supply circuit for the current consuming devices, but indirectly controls the supply circuit branch by means of a solenoid switch. This solenoid switch is controlled in a special manner by the ignition switch and the thermostatic switch. The thermostatic switch is placed near the engine of the car and controls one winding of the solenoid switch. Therefore, when the ignition switch is turned off the solenoid switch is still in operative condition under control of the thermostatic protective switch which, however, falls back and thereby deenergizes the solenoid switch, interrupting the current supply for the current consuming devices, as soon as the temperature of the engine has fallen below a certain level.

A further object of the invention consists in simplifying the disabling circuit and devices for the said thermostatic protective device and, according to the invention, these disabling devices consist merely in a switch, preferably placed under the hood of the engine, which controls a short circuit for the thermostatic switch or consists in a manual operating means for the above-named solenoid switch which keeps the latter in operation when it is manually closed.

Further and more specific objects of the invention will be apparent from the following specification.

The invention is illustrated in the accompanying drawings showing two modifications thereof by way of example. It is, however, to be understood that the two modifications which have been illustrated do not intend to show an exhaustive survey of all the modifications by means of which the invention may be applied. The modifications illustrated intend to explain the principle of the invention and the best mode of applying the principle. A modification of the example shown is, therefore, not necessarily a departure from the said principle.

In the drawings:

Figure 1 is a diagram illustrating one embodiment of the invention and more specifically the circuits and connections used.

Figure 2 is another diagram illustrating the modification of a detail.

It has already been explained that the arrangement according to the invention has the special purpose of cutting out the circuit of the current consuming devices of those circuits which are not directly connected with the ignition key switch, as soon as the ignition switch is turned off by means of a thermostatic device which is arranged in the vicinity of the engine and which interrupts all the circuits still in use and not interrupted by the ignition switch when the temperature of the engine falls below a certain limit. It has also been explained that the arrangement according to the invention is especially adapted to be used in such cases in which the current consuming units of the car, such as the headlights, the auxiliary headlights, the lights provided for the illumination of the car, the radio of the car, etc., are directly grounded. In such a case the particular circuit arrangement, such as described in applicant's earlier Patent No. 2,497,792, cannot be introduced without re-wiring and some changes in the installation.

In accordance with the invention the necessary changes in the existing installations can be reduced to a minimum. In the example illustrated in the drawings the protected circuits 4, 5, 6 contain, for instance, the headlights 7, the auxiliary headlights or city lights 8, the lights for illuminating the interior of the car, the radio of the car, etc. (not shown) which are connected with the circuit 6. The said circuits branch off from the main supply circuit 10 which leads over the contacts 11, 12 controlled by the armature 15 of the solenoid switch 16.

The supply circuit 10 leads directly to the supply conductor 14 of the battery 18, the latter being grounded by means of conductor 19. The ground which is usually formed by the chassis of the car providing a return conductor, is indicated throughout in the diagram by the reference numeral 30. From the main supply circuit 10 those circuits 46 which are not protected by the device, for instance, the parking lights, branch off between the contacts 11, 12 and the battery conductor 14.

The circuit 10 is closed when the solenoid switch 16 is energized so that the armature 15 rests on the contacts 11, 12. The energization of the switch depends on the energization of the coil 27 of the solenoid switch which forms part of the grounded circuit 26 branching off from the supply conductor 24 connected with the battery which is controlled by the ignition switch 20 by means of the two ignition switch contacts 21, 22. The said supply conductor 24 also serves as a supply for the ignition circuit 25 of the car which is closed upon closure of the ignition switch 20. If desired, the ignition circuit 25 may also be controlled by the solenoid switch 16.

The arrangement such an described so far corresponds to the normal layout of the connections used in many types of car. The protective circuit 17 according to the invention is in this case not controlled by the ignition switch 20 but branches off directly from the battery conductor 14 and it includes a coil 28 of the solenoid switch 16 which is additional to the coil 27 and which is also capable of energizing said solenoid switch and to hold the armature 15 in closed position. The said circuit 17 leads to the thermostatic device 40 which is arranged in close proximity to the engine 35 and which in provided with contacts which are only closed when the engine is at a predetermined temperature. This temperature is usually that which the engine will acquire when running under load. This temperature is made adjustable and it may be of advantage to vary the temperature at which the thermostatic device opens the circuit 17. Especially, as already pointed out in my earlier patent, the temperature will be adjusted in accordance with the season. The circuit 17 controlled by the thermostat 40 is grounded over the conductor 32 so that current flows through the coil 28 as long as the temperature of the engine is above the limit for which the device has been adjusted.

The disabling circuit for the thermostatic device 40 is indicated at 33, 34 and consists of a short circuiting branch 33 provided with a switch 34. The thermostatic device is thereby short circuited when the switch 34 is closed and this branch circuit 33 thus establishes a ground connection closing the circuit from the battery to the coil 28. Thereby the main supply circuit 10 is kept closed even if the thermostat 40 should interrupt the circuit 17. Such a disabling of the thermostatically controlled circuit is necessary in order to deal with certain emergencies which may require a continuous operation of the headlights, or the illumination of the car, or of some testing unit while the ignition switch is turned off and the engine is cold.

Preferably the switch 34 is located under the hood of the engine or at some place at which it is not reached quite easily so that it is not regularly operated, thus eliminating the possible misuse or abuse of the emergency device. The switch 34 may also be so arranged that it is operated when one of the front seats is occupied. This arrangement permits an initial use of the circuit consuming circuits which is not dependent on the closure of the ignition switch.

Another arrangement for disabling the thermostatic device 40 consists in a hand-operated means 31, such as a push button, for closing the solenoid switch 16 by pressing the armature 35 on the contacts 11 and 12. The closure of the circuit 10 is thus independent from any current flowing to one of the windings 27 or 28 and the main supply circuit 10 is thus completely under the control of the driver irrespective of deenergization of the solenoid 16.

As in the case of the switch 34, it is preferable to make button 31 closing the solenoid switch accessible only after a separate manipulation has been performed, for instance, by placing said button under the hood of the car or by enclosing it within a compartment which must be specially opened. Alternatively, a signal may be provided indicating that the switch has been operated.

The operation of the protective circuit arrangement has already been partly described. It is, therefore, only necessary to state that under normal condition the driver operates the ignition key switch 20 when starting the car and that this operation will also energize the coil 27 and thereby the armature 15 will close the contacts 11 and 12 and the supply circuits for the current consuming devices 4, 5, 6 will be connected with the battery conductor 14. When the car stops and the driver withdraws the ignition key from the lock thus opening the contacts 21 and 22 the solenoid switch does not fall back because current still flows through the circuit 17 and the coil 28 as long as the thermostatic device is closed. When the engine temperature drops the thermostatic device 40 opens, the solenoid switch 15 also opens and the current consuming circuits 4, 5, 6 are cut off from their connection with the battery.

Should the driver, however, wish to have one of the circuits 4, 5, or 6 operative for an indefinitely extended period of time after the ignition is turned off, he may disable the thermostatic device by closing the switch 34 whereby the connection of the circuit 17 with the conductor 32 and the ground 30 is maintained over the shunt connection 33 and the switch 34.

Likewise in the modification according to Figure 2, the driver may press the button 31 in order to close the switch thus maintaining the connection of the main supply conductor 10 with the battery irrespective of the operation of the thermostatic device 40.

It will be clear that in addition further modifications may be made without departing from the essence of the invention as defined in the annexed claims.

Having described the invention, what is claimed as new is:

1. A protective system for automobiles driven by an engine with a main supply circuit, controlled by an ignition key controlled solenoid switch with a plurality of solenoid windings one of which is connected with an ignition key controlled operative circuit, said main supply circuit being connected with a source of currents on one side and with grounded headlight circuit and grounded further appliance circuit on the other side, comprising a thermo-responsive switch device with a heat responsive element, placed in the vicinity of the automobile engine and operated by the heat developed by the engine during its operation, and with switching contacts opened and closed by said heat responsive element, a separate circuit solely controlled by the switching contacts of the thermo-responsive switching device and directly connected with the source of currents on one side and grounded on the other side, said circuit including solely one of the coils of the ignition controlled solenoid switch, said coil providing an independent control of the said solenoid switch and of the main supply circuit, thus controlling the headlight and other appliance circuits independently of the ignition key and solely in conformity with the thermic response of the thermo-responsive switching device.

2. In a protective automatic circuit breaking system as claimed in claim 1, a disabling circuit arranged in parallel to the circuit controlled by the switching contacts of said thermo-responsive switching device, and a separate manually operated switch in said circuit for controlling the same independently of the thermo-responsive switching device.

3. In a protective automatic circuit breaking system as claimed in claim 1, a disabling device consisting in a hand operated push button for closing the solenoid switch manually.

WILLIAM POZNIK.

References Cited in the file of this patent

UNITED STATES PATENTS

| Number | Name | Date |
| --- | --- | --- |
| 910,682 | Hill | Jan. 26, 1909 |
| 2,497,792 | Poznik | Feb. 14, 1950 |